United States Patent [19]

Powers

[11] 4,438,452
[45] Mar. 20, 1984

[54] TRANSCODER FOR SAMPLED TELEVISION SIGNALS

[75] Inventor: Kerns H. Powers, Princeton, N.J.

[73] Assignee: RCA Corporation, New York, N.Y.

[21] Appl. No.: 411,907

[22] Filed: Aug. 26, 1982

Related U.S. Application Data

[63] Continuation of Ser. No. 262,619, May 11, 1981, abandoned, which is a continuation-in-part of Ser. No. 230,384, Feb. 2, 1981, abandoned.

[51] Int. Cl.³ ............................................. H04N 9/493
[52] U.S. Cl. ............................................. 358/13; 358/11
[58] Field of Search ...................... 358/11, 12, 13, 16, 358/21 R, 140, 141, 142, 146, 4, 8

[56] References Cited

U.S. PATENT DOCUMENTS

| | | | |
|---|---|---|---|
| 3,891,994 | 6/1975 | Philips | 358/16 |
| 4,009,486 | 2/1977 | Thompson | 358/13 |
| 4,200,881 | 4/1980 | Carnt | 358/16 |
| 4,204,227 | 5/1980 | Gurley | 358/13 |
| 4,276,565 | 6/1981 | Dalton | 358/140 |
| 4,322,739 | 4/1982 | Drewery | 358/13 |

FOREIGN PATENT DOCUMENTS

| | | |
|---|---|---|
| 1391434 | 4/1975 | United Kingdom . |
| 1455822 | 11/1976 | United Kingdom . |
| 1413637 | 11/1975 | United Kingdom . |
| 2002154 | 2/1979 | United Kingdom . |
| 2019154 | 10/1979 | United Kingdom . |
| 1567660 | 5/1980 | United Kingdom . |

Primary Examiner—Tommy P. Chin
Attorney, Agent, or Firm—E. M. Whitacre; W. H. Meise; L. C. Edelman

[57] ABSTRACT

A transcoding arrangement transcodes signals sampled at a first frequency into second signals clocked at a second frequency. The first and second frequencies are selected so that their quotient is the ratio of integers. This results in recurrent blocks of samples having integer numbers of input samples and new output samples. A transcoder uses delay elements to form successively delayed samples of the input signal. Subtractors form difference signals representing the amplitude difference between successive delayed samples. Multipliers coupled to the subtractors multiply the difference signals by a running variable multiplicand to form weighted difference signals. The running variable is related to the effective position of the new sample being formed within a transcoding block of samples. The weighted difference signals are summed in an adder to form the new sample values. In a preferred embodiment of the invention, the ratio of the first and second frequencies is selected to be the ratio of an integer divided by an integer power of two ($2^r$), which results in blocks of samples in which the number of new samples is $2^r$, with the result that the multipliers can advantageously be of the shift-and-add type.

7 Claims, 16 Drawing Figures

Fig. 5 SQUARE-LAW INTERPOLATOR

Fig. 6

| NEW SAMPLE | LIES N/16 BETWEEN | INCOMING SAMPLES |
|---|---|---|
| 0 | 0 | 0-1 |
| 1 | 5/16 | 1-2 |
| 2 | 10/16 | 2-3 |
| 3 | 15/16 | 3-4 |
| 4 | 4/16 | 5-6 |
| 5 | 9/16 | 6-7 |
| 6 | 14/16 | 7-8 |
| 7 | 3/16 | 9-10 |
| 8 | 8/16 | 10-11 |
| 9 | 13/16 | 11-12 |
| 10 | 2/16 | 13-14 |
| 11 | 7/16 | 14-15 |
| 12 | 12/16 | 15-16 |
| 13 | 1/16 | 17-18 |
| 14 | 6/16 | 18-19 |
| 15 | 11/16 | 19-20 |
| 0 | 16/16 | 20-21 |

Fig. 7

| n | | n' | |
|---|---|---|---|
| 0 | 0000 | 0 | 0000 |
| 1 | 0001 | 5 | 0101 |
| 2 | 0010 | 10 | 1010 |
| 3 | 0011 | 15 | 1111 |
| 4 | 0100 | 4 | 0100 |
| 5 | 0101 | 9 | 1001 |
| 6 | 0110 | 14 | 1110 |
| 7 | 0111 | 3 | 0011 |
| 8 | 1000 | 8 | 1000 |
| 9 | 1001 | 13 | 1101 |
| 10 | 1010 | 2 | 0010 |
| 11 | 1011 | 7 | 0111 |
| 12 | 1100 | 12 | 1100 |
| 13 | 1101 | 1 | 0001 |
| 14 | 1110 | 6 | 0110 |
| 15 | 1111 | 11 | 1011 |

Fig.11  GENERALIZED INTERPOLATOR

TRANSCODER FOR SAMPLED TELEVISION SIGNALS

This is a continuation of application Ser. No. 262,619, filed May 11, 1981 which is a continuation-in-part of Ser. No. 230,384 filed Feb. 2, 1981 both abandoned.

This invention relates to a digital television system which is compatible with the most widely-used worldwide television standards, and to arrangements for ready transcoding between video signals sampled at various rates.

Various characteristics of a worldwide standard for compatible digital television have been considered. It has variously been suggested that there should be an equal number of samples during the total duration of a horizontal line in both 525-line 60-hertz (NTSC) and 625-line 50-hertz (PAL/SECAM) systems, or possibly an equal number of samples during the active portion of each line. Also among the issues relating to such a worldwide standard are the sampling frequency appropriate for limited bandwidth systems and yet having adequate resolution, and whether the standard should be a composite luminance-chrominance system as opposed to component systems such as RGB or YIQ.

It is also desirable to have a digital television standard which is hierarchical. A hierarchical system is one in which various grades or levels of detail or service can be simply transmitted, as by filtering and deleting samples. Thus, a digital system might allow for generation of signals at a very high sample rate providing resolution suitable for cinema-type use. Such a resolution might be 2000 lines per raster vertically and 2000 television lines horizontally. Television production houses might for editing purposes wish to use a resolution greater than the standard television resolution but might wish to use equipment less costly than that capable of operating at data rates commensurate with a 2000-line raster. Thus, the television production house might use equipment capable of using the second level of the hierarchy, which is 1000-line resolution. If a tape recording originally made at the 2000-line resolution level were available to the production house, filtering and deleting alternate samples of each line would reduce the resolution to the 1000-line level. The next level in the hierarchy might be 500-line resolution, which might be used in a television broadcast station for generating analog video for transmission to homes. A tape edited by a television production house could be used by the broadcaster in equipment capable of 500-line resolution by deleting every other sample. Alternatively, the television station could use a 2000-line resolution tape by deleting 3 samples out of 4. The next step in the hierarchy might be applicable to electronic newsgathering cameras at 250-line resolution, and the next lower level of resolution might be used for surveillance purposes.

It is commonly expected that in the United States and in other countries using NTSC standards that equipment will be commonly available for processing television signals in a composite form. It is highly advantageous in such equipment to have the sampling rate an integer multiple such as 3 or 4 times the color subcarrier frequency (3×SC, 4×SC). It seems very likely that the world standard for digital television when it is ultimately adopted will not be based on a sampling rate locked to a color subcarrier. However, it is very desirable that subcarrier-locked sampled composite video be easily transcodeable to have the characteristics of the standard when that standard is adopted. In all likelihood, this transcoding will require interpolation of the values of the samples in the world standard from the values of the nearest adjacent samples of the composite NTSC video. Naturally, if the clock rates were identical, the samples would be identical and no interpolation would be necessary. Exact interpolation is complex and requires multiplications and additions for each interpolated sample. Multipliers especially tend to be slow in operation and in order to achieve operation at high video data rates they may be expected to be expensive.

It would be highly desirable to have a worldwide television standard for digital video which is compatible between the 625/50 and 525/60 standards as to sampling frequency, which is hierarchical and which is also readily transcodeable from composite NTSC video sampled at a multiple of the subcarrier rate without the use of multipliers.

The original NTSC standard horizontal line frequency for monochrome television was 15,750 hertz. With the adoption of color systems the line rate was changed to be related to the sound subcarrier frequency of 4.5 MHz. The exact horizontal line rate is 1/286×4.5 MHz, which the CCIR has standardized to 15734.264±0.0003% Hz. More recently, the FCC has defined the color subcarrier frequency in megahertz as the quotient 315/88, and the line rate is 2/455 times that subcarrier frequency which is approximately 15,734.266. In the 625/50 standard, the horizontal line rate is 15,625 hertz.

It is known that a common clock frequency of precisely 13.5 MHz provides exactly 864 samples per horizontal line in the 625/50 system and that it provides exactly 858 samples per line in the 525/60 system. Thus, sampling rates of 13.5 MHz (and other sampling frequencies related thereto by multiples of 2.25 MHz) provide integer numbers of samples per line in both systems.

The duration of the horizontal line in a 625/50 system is 64.00 μS, and in the 525/60 system the duration is approximately 63.56 μS. The CCIR standards for the 625/50 system provides for an active line duration of approximately 52 microseconds with a blanking duration of 12 microseconds. The blanking duration according to present NTSC color standards is 10.9±0.2 μS, but proposals have been made for change of this standard. Thus, the blanking duration in NTSC is not clearly defined. If it is assumed that the active line duration in 525/60 is also 52 μS the 13.5 MHz sample rate yields 702 samples for the active portion of each line. The number of samples occurring during the blanking portion, however, varies from 162 in the 625/50 system to 156 in the 525/60 system.

SUMMARY OF THE INVENTION

A transcoding arrangement transcodes signals sampled at a first frequency into second signals clocked at a second frequency. The first and second frequencies are selected so that their quotient is the ratio of integers. This results in recurrent blocks of samples having integer numbers of input samples and new output samples. A transcoder uses delay elements to form successively delayed samples of the input signal. Subtractors form difference signals representing the amplitude difference between successive delayed samples. Multipliers coupled to the subtractors multiply the difference signals by a running variable multiplicand to form weighted difference signals. The running variable is related to the effective position of the new sample being formed within a transcoding block of samples. The weighted difference signals are summed in an adder to form the new sample values. In a preferred embodiment of the invention, the ratio of the first and second frequencies is selected to be the ratio of an integer M and a power of two ($2^r$), which results in blocks of samples in which the number of new samples is $2^r$, with the result that the multipliers can advantageously be of the shift-and-add type.

DESCRIPTION OF THE INVENTION

Figure 1:
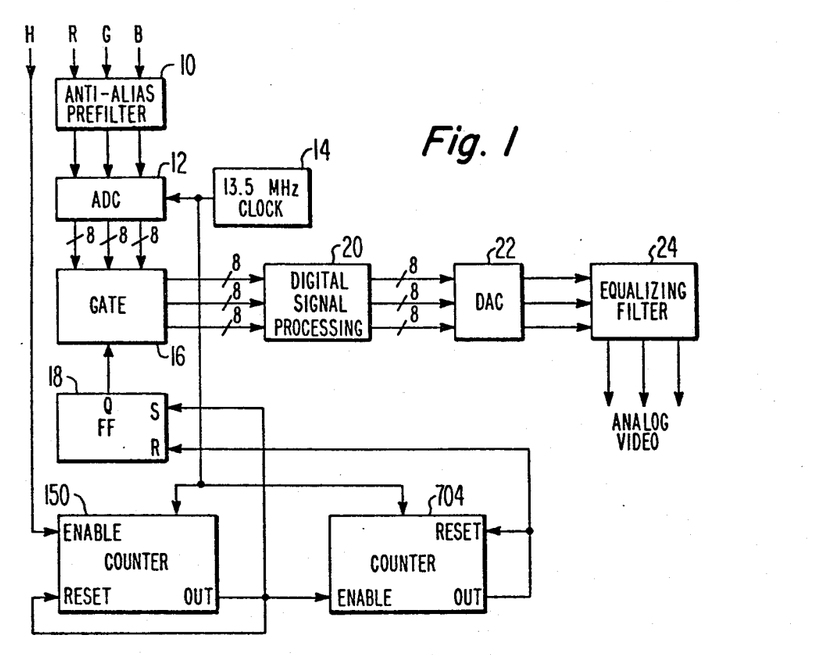
FIG. 1 is a block diagram of a television system including a digital portion in accordance with one aspect of the invention.

FIG. 1 illustrates an arrangement in accordance with the invention. In FIG. 1, analog red (R), green (G) and blue (B) signals, together with horizontal synchronizing signals (H) are provided from a source (not shown) such as a television camera. The H signal is applied to the enable input of a 150-counter 150, while the R, G and B signals on their separate lines are applied to an appropriate anti-alias prefilter 10 where the bandwidth is limited to prevent the band-limited R, G and B signals are applied to an analog-to-digital converter (ADC) 12 within which the separate R, G and B signals are sampled and quantized at a 13.5 MHz rate under the control of a clock signal applied thereto from a clock generator 14. ADC 12 may generate the R, G and B signals at its output terminals in the form of multiple parallel channels for each signal or as a single serial channel for each signal. In the illustrated embodiment, 8 parallel lines are used for each signal.

The signals are applied from ADC 12 to a gate 16 which can be enabled by a flip-flop 18 to allow samples to pass or which can prevent the passage of samples to further digital signal processing illustrated as a block 20. The digital signal processing 20 forms no part of the invention and in some function which it is desirable to perform in a digital mode. For example, the digital signal processing may include tape recording, tape editing, color control or blending or other special effects. Also, digital signal processing could simply be a transmission channel by which the digital signals are sent to a distant location. After signal processing, the signals need no longer be in digital form and are therefore applied to a digital-to-analog converter (DAC) 22 where quasi-analog samples are generated. The quasi-analog signals produced thereby are applied to an equalizing filter 24 for filtering or smoothing to produce appropriate analog video.

In accordance with one aspect of the invention, gate 16 is enabled to define the active line and controlled so as to allow precisely 704 samples to flow through the digital signal processor 20 during each active line. The timing control required is provided by a flip-flop (FF) 18, counter 150 and counter 704. H sync signals 204 defining the beginning of each horizontal line are applied to the enable input of counter 150, to another input of which are applied 13.5 MHz clock signals 202 from generator 14. Counter 150 counts 150 clock or sample pulses, and produces at the end t150 of this time interval an output pulse which is applied to the reset input of counter 150, to the enable input terminal of counter 704 and to the set input terminal of FF 18 to cause the Q output of the FF to go high to enable gate 16 to begin to pass samples. Counter 704 begins to count at time t150 in synchronism with the samples flowing through gate 16 and when precisely 704 samples have been counted, counter 704 produces an output signal at time t854 which resets counter 704 and which is also applied to the reset input of FF 18 to reset the Q output to zero to thereby disable gate 16 and prevent the passage of further samples, thus defining the end of the active interval.

Figure 2:
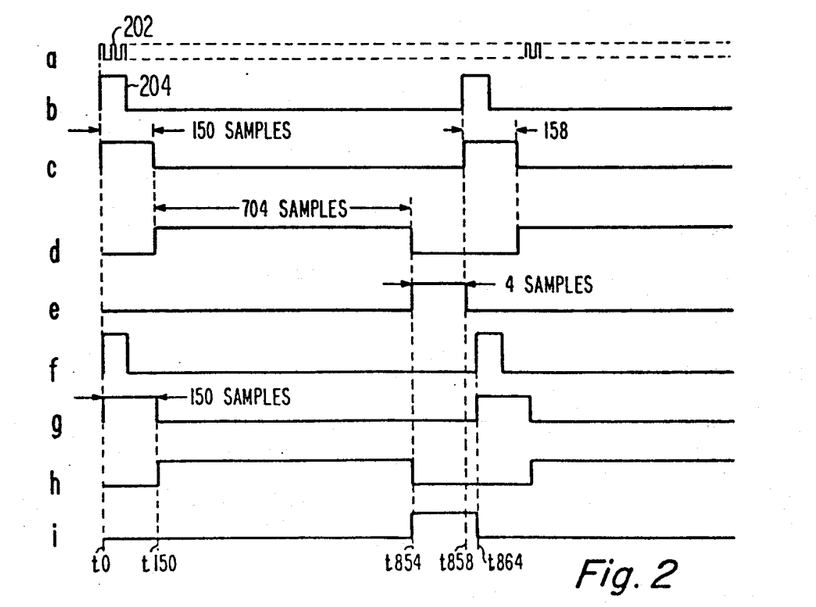
FIG. 2 illustrates timing signals useful in understanding certain aspects of the arrangement of FIG. 1.

The operation of the timing arrangement of FIG. 1 and the differences between 525/60 and 625/50 operation are more clearly shown in FIG. 2. In FIG. 2a, clock samples 202 are illustrated, not to scale. In FIG. 2b, horizontal sync pulses 204 are illustrated which are at a 15734.266 nominal rate. Beginning a time t0 corresponding to the beginning of a horizontal line, counter 150 counts until time t150 as illustrated in FIG. 2c and produces an output pulse at time t150 which begins the gating of samples through gate 16 and enables counter 704 which counts until time t854 as illustrated in FIG. 2d. FIG. 2e illustrates the remaining time until the next following horizontal sync signal which occurs beginning at time t858. The second part of the blanking interval, defined by the duration illustrated in FIG. 2e, is 4 samples. FIG. 2f illustrates horizontal sync signals occurring at a nominal rate of 15,625 hertz. The duration of count of counter 150 is illustrated in FIG. 2g and the duration of count of counter 704 is illustrated in FIG. 2h and terminates as in the first case at time t854. However, the blanking interval is now longer and extends from time t854 to time t864 at which time the next horizontal sync signal occurs to begin the cycle again.

Since the active interval in the described system is defined by 704 samples, the remainder of the interval is by definition blanking. The 150-count of counter 150 defines substantially all of the blanking interval which would occur when the system input is from a 525/60 source. With such a source, that portion of the blanking interval defined by the 150-counter is larger than that portion of the blanking interval occurring after the time t854 of resetting of counter 704 and FF 18 and the time t0 of the next following horizontal sync pulse. Thus, the first portion of the blanking interval occurs after each H sync pulse, and is defined by counter 150. The second part of the blanking interval begins after the active line and extends until the next following H sync pulse. Consequently, the duration of the second portion of the blanking interval which occurs during each line will vary depending upon the duration of a horizontal line as defined by the source standards.

The significance of the number 704 is derived from the fact that 704 is rich in powers of 2 ($704 = 2^6 \times 11$) and consequently, it can support 6 levels of hierarchy. Furthermore, 704 samples per line allows the blanking intervals for the 625/50 system to be met and is extremely close to the specified limits of the NTSC blanking interval.

The arrangement of FIG. 1 illustrates a digital signal processing system according to the invention in which the source synchronization may correspond to either a 625/50 or a 525/60 standard and in which the input signal is analog. However, in many cases it may be desirable to transcode from another digital system into the standards described in conjunction with the arrangement of FIG. 1. For example, it has been mentioned that in the United States and possibly in other countries it may be desirable to have a system of digital video in which the standard clocking rate is based upon a multiple of the subcarrier rate, such as 4×SC. As will be described, the number 704 is also advantageous in that it allows for easy transcoding between such a composite NTSC digital standard and the general or world standard described in conjunction with FIG. 1.

Figure 3:
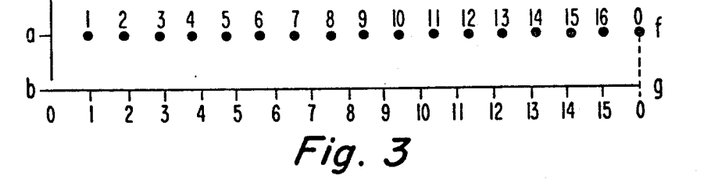
FIG. 3 is a timing diagram useful in understanding the relative sampling times when transcoding from NTSC composite color television signals to signals according to the standards of the arrangement of FIG. 1.

In a composite NTSC television signal sampled at 4×SC, 910 samples occur during each complete horizontal line. However, 754 of the samples occur during the active portion while the remaining 156 occur during the blanking intervals. In order to accomplish transcoding according to another aspect of the invention, 748 samples per active portion of each line are required. The number 748 is chosen because it has a common factor of 44 ($748 = 17 \times 44$) with the number of samples in the world system ($704 = 16 \times 44$). This means that each horizontal line of either system can be divided into 44 transcoding blocks, one of which will contain 17 samples per block while the other contains 16 samples per block. FIG. 3 aids in visualizing this scheme. The horizontal axis in FIG. 3 represents time. The length of the line in FIG. 3b is 16 units long, with each mark representing a sample time. The 16 samples shown in the block of FIG. 3b correspond to one of 44 similar blocks which may occur sequentially during the active portion of a horizontal line in the world digital standard. The block of samples illustrated in FIG. 3a occupies approximately the same time duration as does the block illustrated in FIG. 3b. However, the block of samples of FIG. 3a has 17 samples rather than 16. Nevertheless, it will be understood that 44 blocks of samples such as shown in FIG. 3a will occur within the same time as 44 blocks of those shown in FIG. 3b. By selecting the total number of samples so that they can be divided into relatively small blocks, the amount of signal processing necessary for transcoding may be much reduced. Assuming that digital signals are available sampled at the rate illustrated in FIG. 3a, it will be apparent that to generate a signal according to the clocking system of FIG. 3b some interpolation will be required. For example, the seventh sample in FIG. 3b lies approximately half-way between the seventh and eighth samples in FIG. 3a. Consequently, the value of the seventh 3b sample can be approximated by the average of the values of the signal at the seventh and eighth sample points of the incoming signal clocked as in 3a. Similarly, the second sample (sample number one) of FIG. 3b lies very close to the second sample (sample number one) in FIG. 3a, and its value may be estimated to be equal to the signal value at sample 1 of FIG. 3a plus 1/16th of the difference between the values at sample number one and two. Generally speaking, the value $g_n'$ of the nth linear interpolated output sample is determined by $$g'_n = f_n + \frac{n}{16}(f_{n+1} - f_n) \quad (1)$$

where n may range from 0 to 16 and represents the sample number of the new samples being generated. The transcoding aspect of the invention uses the fact that the factor 17/16 is the ratio of small integers, and that the denominator of the ratio is a power of 2.

Figure 4:
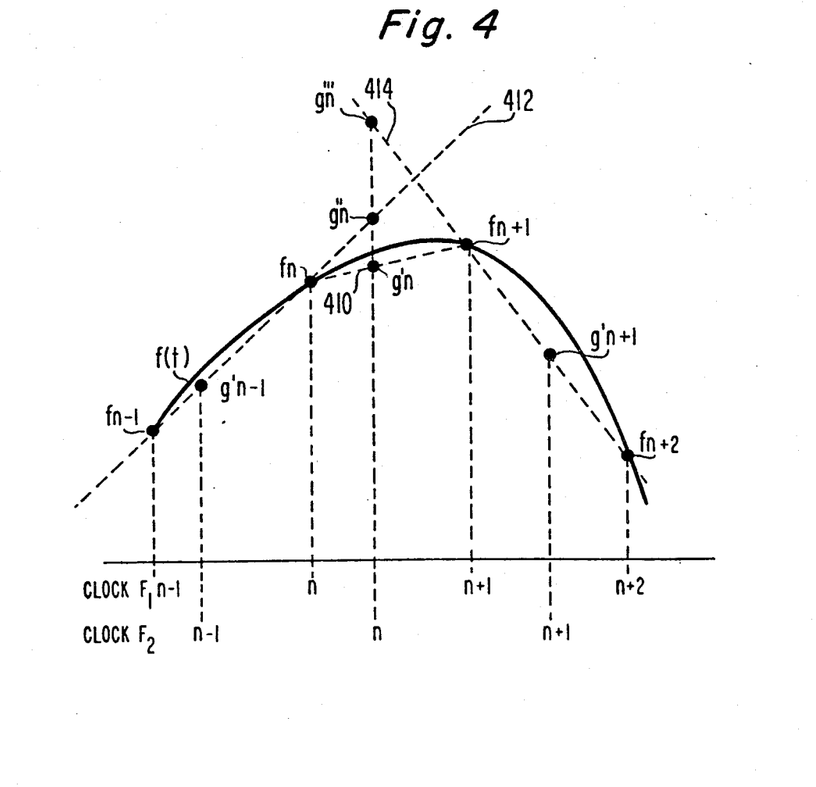
FIG. 4 illustrates a generalized waveform aiding in understanding the errors arising upon transcoding by interpolation at the new sample points of the values of the signal as originally sampled.

In accordance with the waveform f(t) of FIG. 4, let $f_n$ be the sequence of sample values at the rate of 4×SC which is frequency $F_1$. The straight lines connecting successive sample values represent a linear approximation to the analog waveform f(t), and the samples marked $g'_n$ represent interpolated samples at the clock rate of 13.5 MHz ($F_2$). The operation defined by equation 1 consists of two additions and one multiplication. One of the factors in the multiplication is the fraction n/16 where n is a small integer. Although electronic multiplication of binary numbers is a complex and time consuming operation, division by two is readily accomplished by moving one bit in a shift register. Any binary number, e.g., 234=11101010 can be divided by two simply by adding a zero ahead of the most significant digit. The result becomes 01110101=117 which is precisely half of the previous number to 9-bit accuracy for an 8-bit original quantization. Thus, multiplication of a sample value by a multiplying factor, say 7/16, can be accomplished by dividing the original sample value S four successive times by the integer 2 to get respectively 8/16S, 4/16S, 2/16S, and 1/16S of the original sample value. Then 7/16 times the value is obtained by adding the values obtained for 4/16S+1/16S+1/16S in two successive additions. Thus, any number in digital form can be multiplied by the factor n/16 by four successive shifts and up to three successive adds. This technique can be generalized to any multiplying factor $n/2^r$ for any integer r.

Linear approximation by the preceding technique may create errors in the interpolation process. The error in FIG. 4 is equivalent to the difference between the value of the curving waveform f(t) at the time n of the sample point $g'_n$ and the point on the straight line 410 between $f_{n+1}$ and $f_n$. This error can be small especially when the interpolated result is quantized to the same number of levels as the input waveform. The errors tend to be largest at points of maximum concavity in the incoming waveform and are in the direction toward the inside of the concavity. Such errors do not occur in flat (constant level) regions of the picture or in linearly changing regions but occur only in the vicinity of changing slope (concave down or concave up). Thus interpolation errors will occur only in regions of high definition or rapidly changing edges. The subjective effect of the error is to reduce the concavity, or to soften the picture edges.

The interpolation error resulting from concavities in the analog approximation f(t) from which the original sample values $f_n$ were derived can be significantly reduced by using information drawn from more of the surrounding points, as by using three or four samples instead of two. This is accomplished by using the extensions 412 and 414 of the straight-line approximations formed between sample points $f_{n-1}$ and $f_n$ and between $f_{n+1}$ and $f_{n+2}$, respectively. Realizing that the time of occurrence n of new samples $g'_n$ at the $F_2$ clock rate can occur very near the time of sample $f_n$ at the beginning of a block of samples, or very near the time of sample $f_{n+1}$ near the end of a block of samples, it will be apparent that the weight to be given to approximations $g''_n$ or $g'''_n$ in determining the actual value $g_n$ of the new sample at time n will depend upon the proximity in time of sample $g_n$ to either sample $f_n$ or $f_{n+1}$. It should be noted from FIGS. 3 and 4 that each new sample value $g_n$ within a block of samples is related one-to-one to an existing sample $f_n$, and consequently the numbering of new samples $g_n$ as shown in FIG. 4 corresponds to the numbering of old or incoming samples $f_n$.

The value of $g''_n$ equals the known value of incoming samples $f_n$ plus as incremental portion of the difference between samples $f_n$ and $f_{n-1}$, because that incremental portion is the same whether it is between $n-1$ and n or between n and $n+1$. Thus $$g''_n = f_n + \frac{n}{16}(f_n - f_{n-1}) \quad (2)$$

Similarly, the value of $g'''_n$ on extension 414 can be determined by adding to the known value of $f_{n+1}$ the difference in sample values between $f_{n+1}$ and $f_{n+2}$ multiplied by one minus the incremental portion used to determine $g''_n$, and therefore $$g'''_n = f_{n+1} + \frac{16-n}{16}(f_{n+1} - f_{n+2}) \quad (3)$$

It will be apparent that when new sample $g_n$ is near the time of $f_n$, the value of $g''_n$ can be added with some weighting to the value determined for $g'_n$ in order to form an approximation, and when $g_n$ is near the time of $f_{n+1}$, the value of $g'''_n$ can be added with a weighting to the value of $g'_n$.

A good approximation for the new sample value $g_n$ when $g_n$ is nearer $f_n$ (when n=0, 1, ... 7) is $$g_n = \frac{16-n}{16} g''_n + \frac{n}{16} g'_n \quad (4)$$

and when $g_n$ is nearer $f_{n+1}$ (when n=9, 10, 11, ... 15)

$$g_n = \frac{n}{16} g'''_n + \frac{16-n}{16} g'_n \quad (5)$$

For n=8, the results $g_n$ from equations (4) and (5) are averaged to get $$g_8 = \tfrac{1}{2}(\tfrac{1}{2} g''_8 + \tfrac{1}{2} g'''_8 + g'_8) \quad (6)$$

It will be noted that equations (4), (5) and (6) are sums of products, where the products are of the form K/16 g. Consequently, the square-law or parabolic approximations $g_n$ of function f(t) can be accomplished by successive divide-by-two and summing operations, as in the case of linear interpolation.

Because of the concavity of f(t) below a straight-line tangent to f(t) at point $f_n$, the interpolated value of $g_n$ between $g'_n$ and $g''_n$ near the center of the interval between n and n+1 is likely to be slightly greater than the actual value of f(t) before it was sampled to produce values $f_n$. Thus, the errors made in the described square-law interpolation process are in a direction which tends to enhance changes, which will have the subjective effect of enhancing transitions or edges in the television picture.

Figure 5:
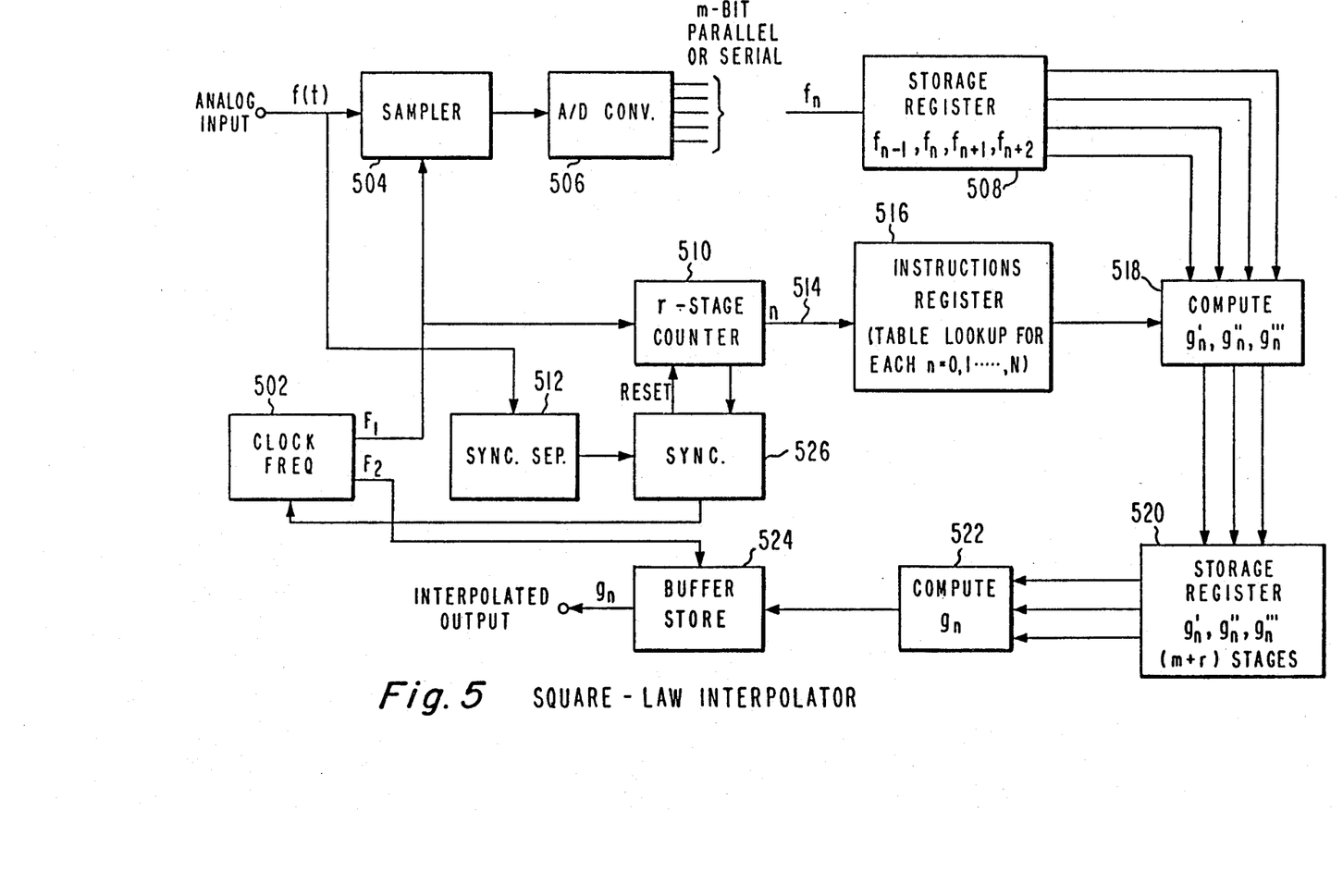
FIG. 5 is a functional block diagram of an embodiment of the invention involving transcoding.

FIG. 5 illustrates an arrangement for performing a square-law interpolation in accordance with the described process. In FIG. 5, the clock frequencies $F_1$ and $F_2$ generated by clock generator 502 are related by $$\frac{F_1}{F_2} = \frac{2^r + 1}{2^r} \quad (7)$$

which as described yields the desirable ability to divide the sample times in each line into interpolation blocks or groups with coincident samples at either end. Composite analog color television signals f(t) are applied to a sampler 504 which recurrently samples the incoming analog signal and holds the samples for a duration sufficient for ADC 506 to quantize the samples into M bits per sample. As shown, the M bits may occur simultaneously on parallel lines or serially on a single line. Each sample of M bits represents one sample value $f_n$. The various samples $f_n$ (such as $f_{n-1}$, $f_n$, $f_{n+1}$, $f_{n+2}$) are stored in succession in a register 508 where they become available so that the various approximations $g'_n$, $g''_n$, $g'''_n$ and ultimately $g_n$ can be calculated.

Synchronization of the various calculations with the blocks of samples is accomplished by horizontal sync signals derived by separator 512 from the analog input signal f(t). The separated sync signals include H sync, blanking, reconstituted color subcarrier and the like. The sync signals are applied to a synchronizer illustrated as a block 526, which transmits a signal related to the color subcarrier to clock signal generator 502 to lock the frequency of sampling clock $F_1$ to 4×SC. Sync block 526 also receives a signal indicative of a full count of N from an r-stage counter 510 for resetting the counter. Sync block 526 also delays enabling of counter 510 until the beginning of the active portion of each horizontal line. In the arrangement of FIG. 5, it has been assumed that the sample rates have been selected as described previously in conjunction with the world digital standard for ease of transcoding by interpolation from a sample rate related to 4×SC, so the number r in equation (7) is known and may be for example a value such as r=4 yielding recurrent interpolation blocks of length of 16 new samples $g_n$ and 17 old samples $f_n$. Counter 510 is coupled to receive start-of-block signals from synchronizer 526 and recurrently counts $F_1$ clock pulses and produces on a line 514 a parallel digital signal representing the current value of n, which in the example may range from a value of 0 to a value of 15.

Counter 510 is also reset to zero as mentioned by synchronizer 516 after each cyclic full count of n=N. The current value of n on conductor 514 is applied to a lookup table 516 which is addressed by the signal on line 514. At each memory location, information is stored as to which samples near $f_n$ are to be used for calculation for the particular value of n. This information is coupled to a computation processor 518 in which are calculated $g'_n$, $g''_n$ and $g'''_n$ as determined by stored instructions in table 516 for the value of n in accordance with the equations (1), (2) and (3). These calculations are performed, as described, by successive division by 2 of the various values $f_n$ and summing of the results of the various divisions according to the stored instructions.

Errors due to rounding-off can be minimized by performing the shifting to accomplish divide-by-two and the additions in shift registers having (M+r) bits. The values of $g'_n$, $g''_n$ and $g'''_n$ computed in 518 are successively loaded into a storage register 520 and are made available to a further computation circuit 522 where the value of $g_n$ is calculated in accordance with instructions from register 516 for the particular value of n for implementing equations (4), (5) and (6). After computation of $g_n$, the least significant bits are dropped to return to an M-bit output and gn is loaded into a buffer 524. The interpolated signals are clocked out of buffer 524 at frequency F2 and form the transcoded signal.

It will be apparent to those skilled in the art that the component system for a world standard may use YIQ; Y, (B-Y), (R-Y) or other components rather than RGB as illustrated. Also, it will be apparent that the duration of the blanking interval defined by counter 150 may be adjusted to the desired duration and position relative to sync.

The interpolation arrangement as so far described relates to transcoding by interpolation of signals related by a sampling frequency ratio F1/F2=M/2$^r$ where M=(2$^r$±1) whereby the F2 samples step progressively across the time separation between successive F1 samples as illustrated in FIG. 3 over the duration of one block of samples. In the specific example described, a frequency ratio of F1/F2 is determined by the ratio of 4×SC/13.5 MHz, which is actually equal to the ratio 35/33, is approximated by the ratio 17/16 so as to correspond to equation (7) for a value of r=4. This allows the advantage of interpolation by successive shifting and addition. The advantages of interpolation by shifting and adding is not limited to the case in which numerator differs from the denominator by an integer other than unity, but they may be realized for any positive integers M and r, so long as M and 2$^r$ have no common factor.

Transcoding between PAL signals at 625 lines per frame, 50 Hz frame rate and the 13.5 MHz proposed world standard may be accomplished by interpolation by this additional method and may have reduced interpolation error.

As described in conjunction with FIG. 4, the interpolated value for a new sample gn in the first or left half of the interval between times n and n+1 at which incoming samples $f_n$ and $f_{n+1}$ respectively occur, is determined by forming amplitude differences between the values of $f_{n-1}$ and $f_n$, and between $f_n$ and $f_{n+1}$, weighting those difference signals in accordance with the relative position in time of the sample in question within a sample block, and adding each one of the weighted difference to the value of $f_n$ to form a sample linearly interpolated between $f_n$ and $f_{n+1}$ and linearly extrapolated from the region between $f_{n-1}$ and $f_n$. The linearly interpolated and extrapolated samples are then further weighted in accordance with their proximity to $f_n$ and summed to produce an interpolated value. In the second or right-hand half of interval n to n+1 a corresponding scheme is applied to points $f_n$, $f_{n+1}$, and $f_{n+2}$. Thus, the interpolation scheme described in conjunction with FIG. 4 uses three samples of the incoming signal to determine each interpolated sample value. It is also possible to make simultaneous use of four incoming sample points in order to achieve improved interpolation for any positive integer M and r, as mentioned.

A generalized transcoding scheme employing any positive integers M and r finds use, for example, when transcoding from 625/50 PAL to 13.5 MHz sampled signals according to the proposed world standard mentioned above. For this transcoding, the PAL signal can be sampled at 4×SC, to yield 1135.0064 samples for each complete horizontal line. It has been known that these samples can be justified or reduced to exactly 1135 samples per field, and the resulting error is a mere 0.16% skew in picture geometry.

The ratio of 1135 samples per PAL line to 864 samples per world standard line is the ratio 1135/864=1.3136574. This figure is very close to the quotient 21/16=1.3125. Consequently, the active line of 704 samples at the world standard 13.5 MHz can be filled with samples from 4×SC PAL by converting 21 input samples at 4×SC to 16 output samples at 13.5 MHz in each block of samples with precisely 44 blocks over the active picture. The result of the approximations involved in such a transcoding is a geometric accuracy of $$(21/16)(864/1135)=0.9991186$$

which represents a geometric distortion in the form of a stretch of less than 0.1 percent. Manipulations of the picture resulting in vertical or horizontal distortions of less than 1% are generally considered acceptable, as it is near the limit of tolerance with which cameras and kinescopes can be aligned. The distortion introduced by the approximations involved in the transducing is much smaller than this limit and is acceptable.

Figure 6:
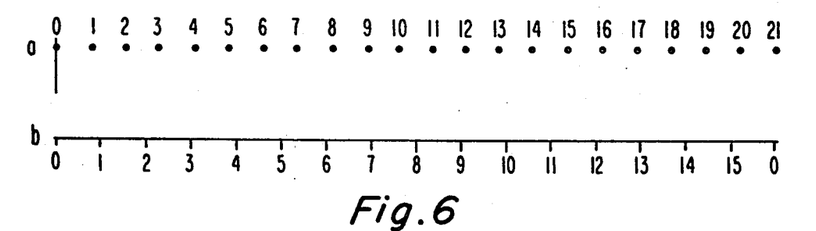
FIG. 6 is a timing diagram useful in understanding the relative sampling times when transcoding from PAL signals to signals according to the standards of the arrangement of FIG. 1.
Figure 7:
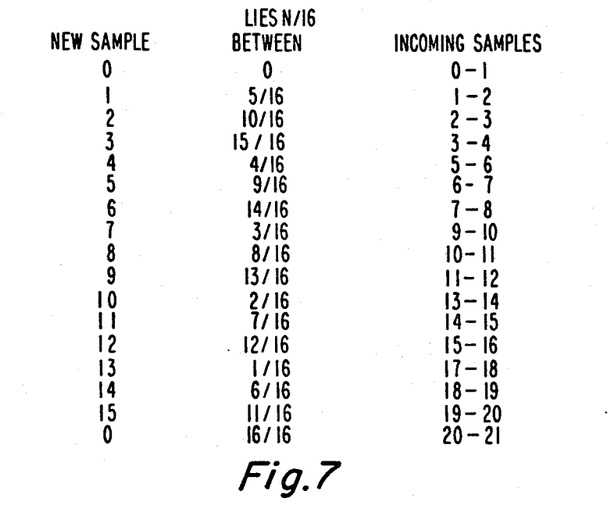
FIG. 7 is a tape listing interpolation weighting factors for PAL transcoding.
Figure 15:
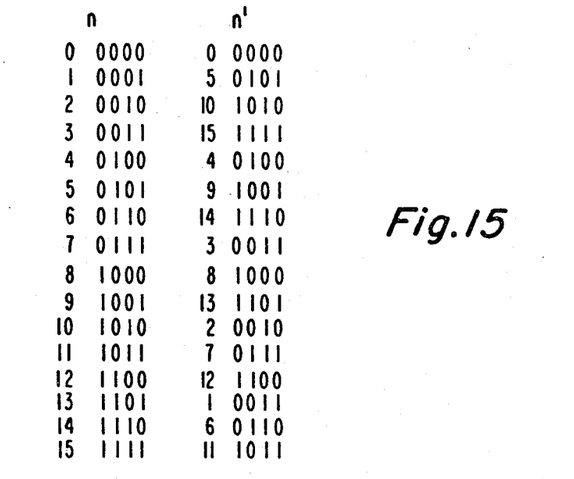
FIG. 15 lists the n to n' translation for a particular transcoding.

Within each transcoding block of samples involved in converting NTSC to world standard, as previously described, the position of each new sample gn stepped across the time separation between incoming samples in a regular progression; at the beginning of each block, $g_n$ occurs simultaneously with $f_n$, and with increasing time moves part-away across or between successive samples $f_n$ and $f_{n-1}$ until at the end of the transcoding block of samples, $g_n$ occurs simultaneously with $f_{n+1}$. This regular progression results from the additional 1 in the numerator of equation (7). This numerator is denominated M. In the case of the PAL signal, M differs from the denominator by more than unity. In particular, in the case of transcoding of PAL to world standard, the quotient can be formed $$\frac{F_1}{F_2} = \frac{M}{2^r} = \frac{2^r + 5}{2^r} = \frac{21}{16} \qquad (8)$$

where numerator M equals 21 and differs from the value 16 of the denominator by 5. The physical meaning of this difference is that within each transcoding block, 21 samples of incoming signal occur within the interval in which 16 new transcoded samples are generated. This arrangement is illustrated in FIG. 6. As in the case of FIG. 3, the length of line b represents the duration of one interpolation block, and is divided into 16 positions which represent sample times. The dots a represent the sample times of the incoming signal. The difference $M-2^r$ has a second physical meaning concomitant with the first. This second meaning may be explained in conjunction with FIG. 6 by noting that each new sample (those points on line b of FIG. 6) lies between input samples (a) at a time position which is $(M-2^r)/16$ or 5/16 of an intersample interval from the previous position. For example, sample points 0 occur simultaneously, new (b) sample point 1 occurs 5/16 of the way between incoming (a) sample points 1 and 2, new point 2 occurs $5/16+5/16=10/16$ of the way between (a) sample points 2 and 3. Similarly, new point 3 occurs 15/16 of the way between incoming sample points 3 and 4, new point 4 occurs at a time $(15/16+5/16)-1=20/16-16/16=4/16$ along the duration between the times of incoming samples 5 and 6. New or outgoing sample 5 occurs $4/16+5/16=9/16$ between incoming samples 6 and 7, and new sample 6 occurs at a time $9/16+5/16=14/16$ between incoming samples 7 and 8. FIG. 7 lists all the positions occurring in FIG. 6. No new samples lie in the time between incoming samples 4-5; 8-9; 12-13; and 16-17. FIG. 15 lists equivalent information for a transcoding in which $r=4$, $M=2^r+5$ The interpolations described in conjunction with FIG. 4 when forming an approximation for $g_n$ (the new value being estimated) use $g''_n$ weighted by a first set of functions in the first half of the interval between successive input samples $f_n$ and a second weighting function in the second half of the interval. This gives an interpolation which might be acceptable under some conditions, but a better approximation (lower error) may be obtained by taking an average of the weighted estimates $g'_n$, $g''_n$, and $g'''_n$ over the entirety of each intersample interval. Such an average is $$g_n = \tfrac{1}{2}\left( g'_n + \frac{2^r - n'}{2^r} g''_n + \frac{n'}{2^r} g'''_n \right) \quad (9)$$

where $$n' = [(M - 2^r) \times n] \text{ (modulo } 2^r) \quad (10)$$

The physical meaning of n' relates to the position of new samples b relative to incoming samples a. In FIG. 6, $$n' = (21 - 16)n \text{ modulo } 16 = 5n \text{ modulo } 16 \quad (11)$$

which means that for each new sample n, the value of n' increases by 5 parts out of 16, as mentioned.

Figure 8:
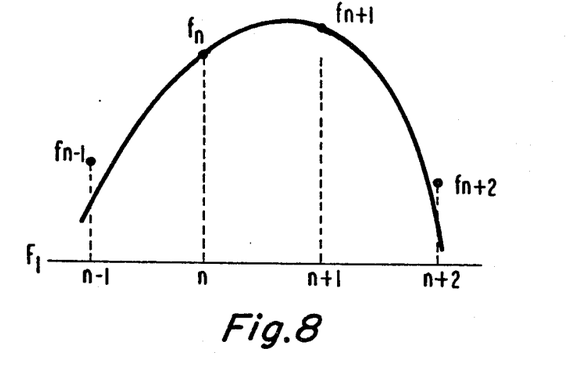
FIGS. 8, 9 and 10 are generalized waveforms aiding in understanding the errors arising upon transcoding by interpolation in a general manner.

The approximation to $g_n$ of equation 9 as illustrated in FIG. 8 represents a parabola which passes through the points $f_n$, $f_{n+1}$. As illustrated, the parabola is more peaked than would be a third-order curve passing through the four points $f_{n-1}$, $f_n$, $f_{n+1}$, $f_{n+2}$.

Figure 9:
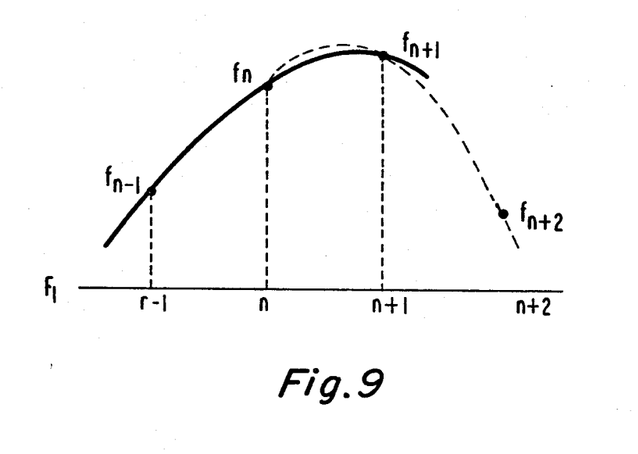

An alternative interpolation scheme is illustrated in FIG. 9. A first parabola 900 is passed through points $f_{n-1}$, $f_n$ and $f_{n+1}$, and a second parabola 902 is passed through points $f_n$, $f_{n+1}$ and $f_{n+2}$.

These can be defined by the following equations:

$$(900)\ g_n = \tfrac{1}{2}\left( \frac{2^r + n'}{2^r} g'_n + \frac{2^r - n'}{2^r} g''_n \right) \quad (12)$$

$$(902)\ g_n = \tfrac{1}{2} \frac{(2^{r+1} - n')}{2^r} g'_n + \frac{n'}{2^r} g'''_n \quad (13)$$

When interpolating a new sample $g_n$ between the times n of sample $f_n$ and time $n+1$ of sample $f_{n+1}$, one could as previously described use equation (12) in the first half of the interval and equation (13) in the second half, with the average of the two at the intermediate point. The average over the entire interval, on the other hand, gives the equation $$g_n = \tfrac{1}{4}\left( 3 g'_n + \frac{2^r - n'}{2^r} g''_n - \frac{n'}{2^r} g'''_n \right) \quad (14)$$

Still another approximation for the value of new sample $g_n$ interpolated between successive samples $f_n$ can be made by weighting equation (12) more heavily near the beginning of the interval and weighting equation (13) more heavily near the end of the interval, the equation for which is $$g_n = \frac{2^r - n'}{2^r} \text{ (equation 12)} + \frac{n'}{2^r} \text{ (equation 13)} \quad (15)$$

Figure 10:
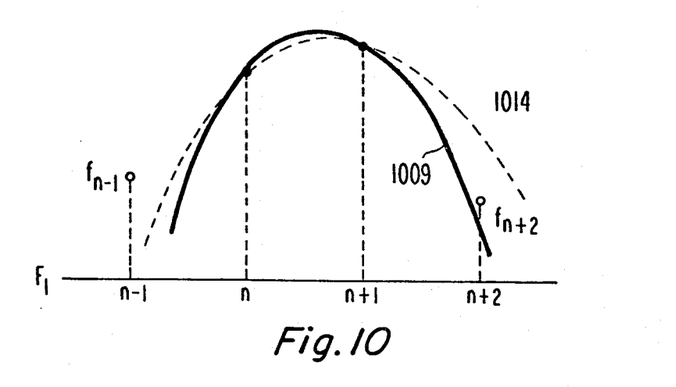

FIG. 10 illustrates generally the differences between the values of new samples $g_n$ as determined by the interpolation approximations described by equation (9) and equation (14). Solid curve 1009 has the shape of a parabola according to equation 9, and dashed curve 1014 has the shape of a parabola in accordance with equation 14. Curve 1009 is relatively sharply curved; falling below points $f_{n-1}$ and $f_{n+2}$, whereas curve 1014 is less sharply curved and lies above these points. Mention has been made of the fact that an interpolation may be arranged to provide enhancement of transitions and thereby provide a picture having a less "soft" or more "crisp" appearance. It is clear from FIG. 10 that interpolation by use of equation 9 will provide new samples which enhance crispness in regions of sharp concavity by comparison with those established according to equation 14.

Equations 4-6 1 and 9-14 represent square-law (or higher-order) interpolations which have the common features of passing through points $f_n$ and $f_{n+1}$ and which represent the sums of multiplications or products of four sample points $f_{n-1}$, $f_n$, $f_{n+1}$ and $f_{n+2}$, and in which the multipliers take the form $p/2^r$ where p is an integer ranging between the values of zero and $2^{r+1}$. The embodiment of the invention can therefore implement these algorithms by a succession of shifts and adds, which are easily implemented in a high-speed form.

Figure 11:
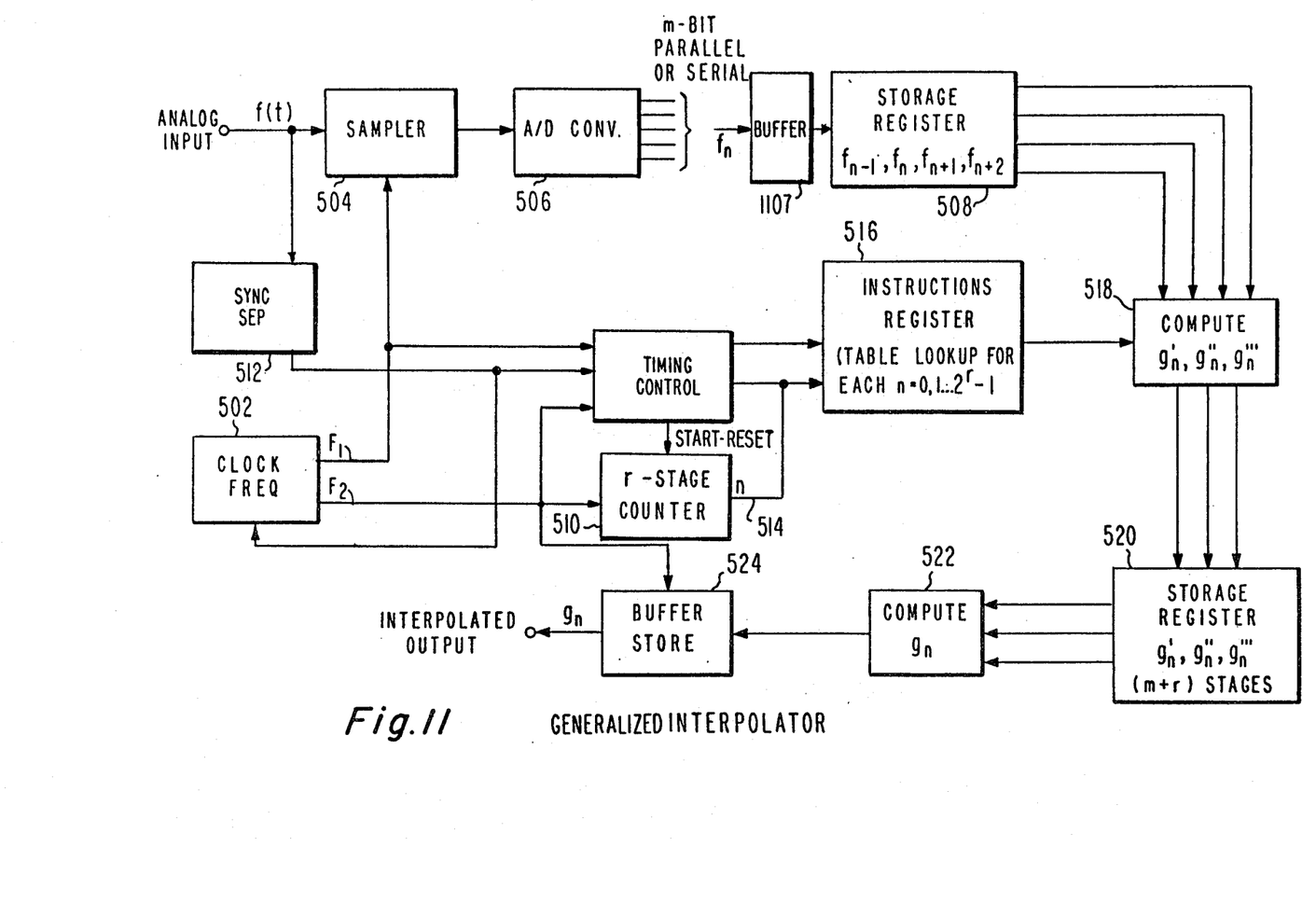
FIG. 11 is a block diagram illustrating generalized interpolator similar to the interpolation of FIG. 5.

A circuit arrangement as in FIG. 11 may be used to implement a transcoding of general type as described above. In FIG. 11, elements corresponding to those of FIG. 5 are designated by the same reference numbers. Clock pulses at the F2 rate are accumulated in an r-stage n-counter 510 which is reset to zero by timing control 1104 when the final count of $2^r-1$ is reached (in the PAL example, reset at 15). For each value of n from r-stage counter 510, ROM instructions register 516 selects the appropriate instructions for calculation of values $g'_n$, $g''_n$, and $g'''_n$ from the currently stored values of $f_n$ in storage register 508.

Figure 12:
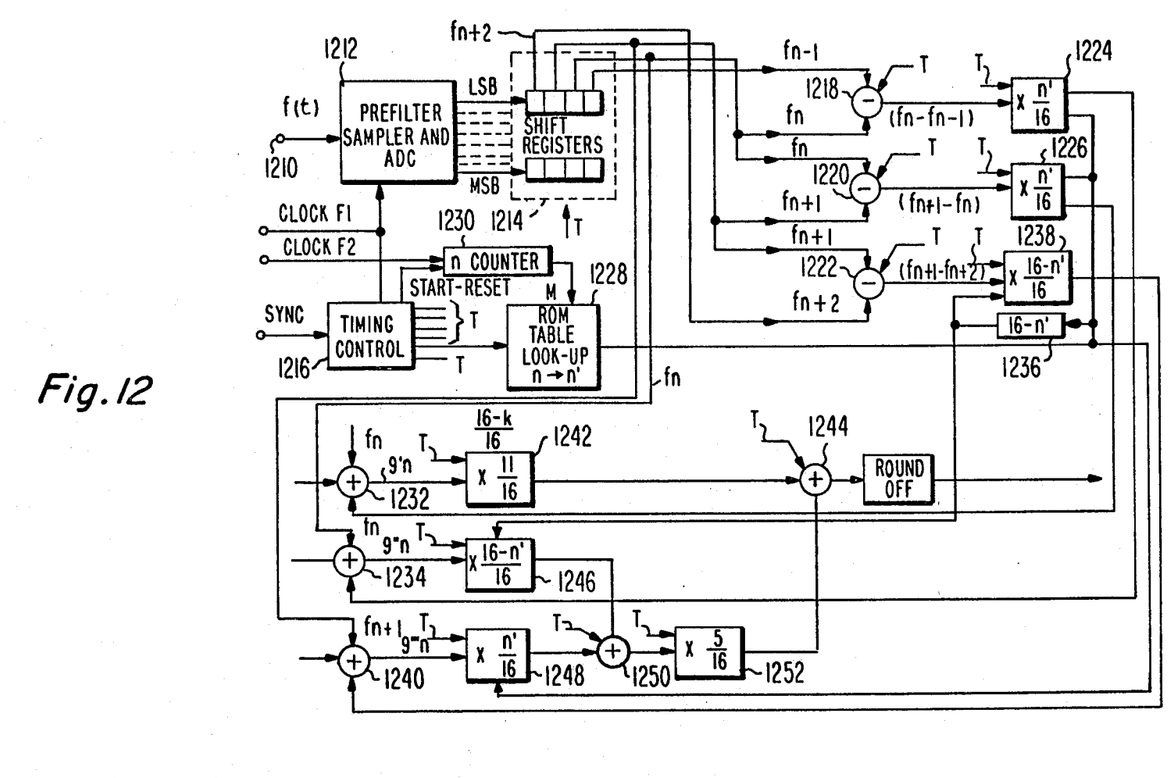
FIG. 12 is a more detailed block diagram of a generalized interpolator adapted for enhanced interpolation of signals in a PAL-13.5 MHz transcoding.

FIG. 12 is a more detailed block diagram of an embodiment of a generalized transducer adapted for transcoding of PAL signals sampled at 4×SC (about 17.7 MHz) to 13.5 MHz. Analog PAL composite signal f(t) is applied by way of input terminal 1210 to a prefilter 17.7 MHz sampler and ADC illustrated as a block 1212. Sampling within block 1212 is controlled by the F1 clock. The output of block 1212 is a plurality (in this case 8) of parallel signal-carrying channels on lines, one of which represents a least-significant bit (LSB) and another the most-significant bit (MSB). The signals on these lines are applied in parallel or simultaneously to a like plurality of shift registers within a block 1214. Only the shift registers for the LSB and MSB signals are illustrated within block 1214. Clocking of shift registers 1214 is controlled by timing signals produced by a timing control circuitry illustrated as a block 1216. Timing circuitry 1210 receives in addition to F1 clock pulses certain sync information relating to the incoming PAL signal so that the processing of the incoming signals may be synchronized so as to occur in transcoding blocks beginning with the active video. The newest signals in the shift registers correspond to $f_{n+2}$ and the oldest to $f_{n-1}$, with $f_n$ and $f_{n+1}$ at intermediate locations. These 8-bit signals are coupled from shift registers 1214 and applied in pairs to the inputs of differencing circuits 1218, 1220, and 1222. Thus, $f_n$ and $f_{n-1}$ are applied to 1218; $f_{n+1}$ and $f_n$ are applied to 1220; and $f_{n+1}$ and $f_{n+2}$ are applied to 1222. The differencing circuits also receive timing (T) inputs from timing control 1216 to synchronize their operation with the samples. The outputs of the differencing circuits 1218 and 1220 are applied to the inputs of multipliers 1224 and 1226, respectively, which multiply by $n'/16$ as described by successive divisions-by-two and additions, depending upon the values of running variable n' applied thereto by ROM look-up table 1228. As mentioned, n' represents the time position of the new sample being generated relative to the times of the adjacent incoming samples. For a given transcoding as from PAL to 13.5 MHz, the frequency ratio is known and therefore the one-to-one correspondence of n' to the sample number is known, as given for example in the table of FIG. 7. ROM 1228 is addressed by information related to new sample clock frequency F2 counted by a counter 1230 into blocks n. Each memory location so addressed was previously loaded with information relating to the value of n' corresponding to the address number n for that particular transcoding. Thus, for each new sample being generated within a transcoding block, multipliers 1224 and 1226 receive from ROM 1228 a suitable value of n' indicative of the additions which must be made of the divided-by-two difference signals.

The output signal from multiplier 1226 is applied to an adder 1232 in which it is summed with the current value of $f_n$ to produce a linearly interpolated sample $g'_n$ as described by equation (1). Similarly, the output signal from multiplier 1224 is applied to a clocked adder circuit 1235 where it is summed with $f_n$ to produce a linearly extrapolated sample $g''_n$ according to equation (2). The current n' value is applied from ROM 1228 to a (16−n') differencing circuit 1236, and the difference signal is applied to an input of a multiplier 1238. The difference signal $(f_{n+1}-f_{n+2})$ produced by difference circuit 1222 is applied to a second input of multiplier 1238. Multiplier 1238 forms a product by successively dividing-by-two and adding depending upon the value of (16−n') to form a product signal which is applied to an adder 1240 for summing with the value of $f_{n+1}$ to form $g'''_n$ per equation (3).

The $g'_n$ value is applied by way of a further multiplier 1242 to a summing circuit 1244. Multiplier 1242 multiplies by a constant value 11/16, which is of the form n/16 and therefore may be implemented by divide-by-two circuits and adders. The $g''_n$ and $g'''_n$ values are weighted by multipliers 1246 and 1248 respectively, in accordance with the position of new sample $g_n$ relative to the adjacent incoming samples.

Multiplier 1248 multiplies by n'/16 and receives from ROM 1228 running variable n' for this purpose. Multiplier 1246 multiplies by (16−n)/16 and receives as a running variable the difference signal (16−n) from differencing circuit 1236. Both of these multipliers are of the desirable high-speed shift-and-add types as described below. These weighted $g''_n$ and $g'''_n$ signals are added in a summing circuit 1250. At the output of summer 1250 the signal is the sum of a small portion of $g''_n$ and a large portion of $g'''_n$ where n' is small, which is to say when new sample $g_n$ is near sample $f_n$. When new sample $g_n$ is near $f_{n+1}$ that is when n' is near 16, on the other hand, the signal produced by summer 1250 is formed by a large proportion of $g''_n$ and little from $g'''_n$. This weighting creates an estimated value of f(t), the analog input signal, which is very peaked or enhanced in areas of curvature. In order to "tone down" the peaking, the summed signal at the output of summer 1250 is multiplied by a fixed factor 15/16 in a multiplier circuit 1252, thereby reducing the weight accorded to the peaked estimate compared with linear estimate $g'_n$. The 11/16 weighted $g'_n$ and 15/16 weighted $g''_n$; $g'''_n$ signals are summed together in summer 1244 and the output is rounded to produce the new estimated value $g_n$.

It will be apparent that the value of the weighting of the signals by multipliers 1242 and 1252 may be varied at will so as to provide the desired degree of enhancement. The enhancement effect may be incorporated into the algorithm by which the new samples are formed:

$$g_n = \frac{2^r-k}{2^r} g'_n + \frac{k}{2^r}\left(\frac{2^r-n'}{2^r} g''_n + \frac{n'}{2^r} g'''_n\right) \quad (16)$$

where k is a crispening constant which may be zero or a positive value up to its maximum value of $2^r$. When k=0, the second term becomes zero and the interpolated value of $g_n$ is merely the linear interpolation $g'_n$ of equation (1). The portion of right-hand term of equation (16) within the parenthesis represents a parabola which matches the values of $f_n$ and $f_{n+1}$, but which has a much sharper curvature than would be expected from the input signal f(t). As k ranges from zero to $2^r$, equation (16) ranges through all possible parabolas that pass through the values $f_n$ and $f_{n+1}$ and lie between the straight line $g'_n$ and the very sharp parabola within the parenthesis of equation (16). A value k=8 for example yields equation (9), and a value of k=4 yields equation (14). In FIG. 12, the value of k is included through fixed-constant multipliers 1242 and 1252. Multiplier 1242 multiplies by (16−k)/16 and multiplier 1252 multiplies by k/16 where k=5 and the transcoder operates generally in accordance with equation (16).

Figure 13:
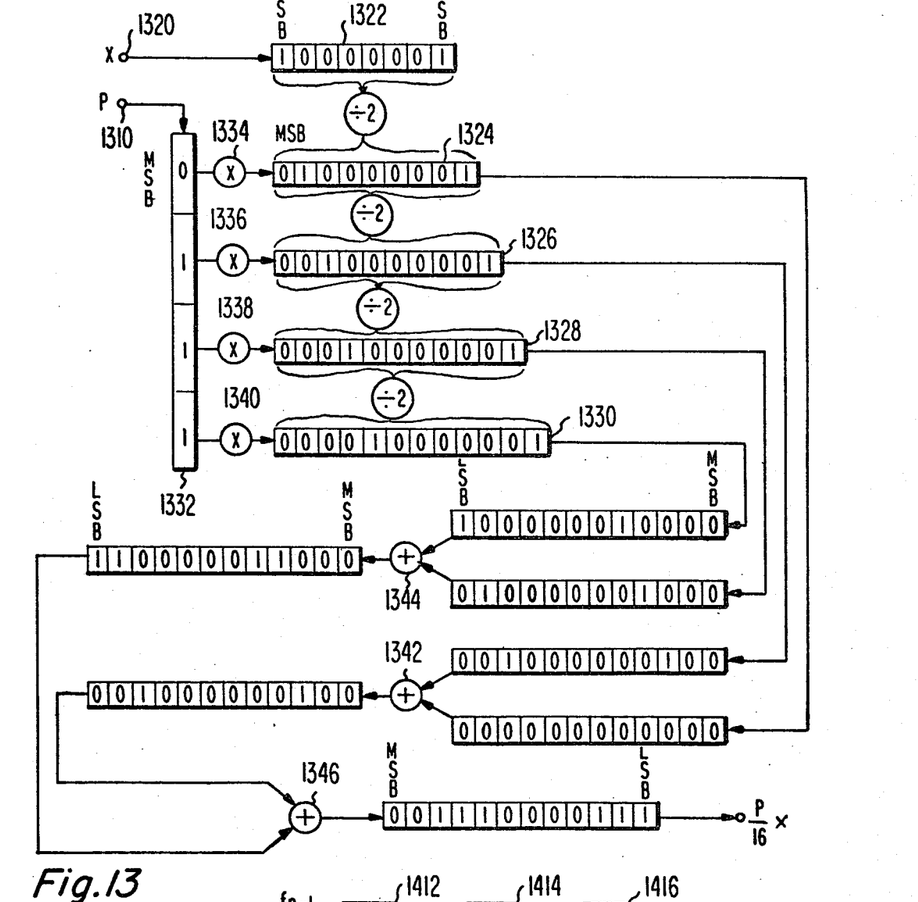
FIG. 13 is a block diagram of a digital multiplier according to an aspect of the invention.

Multipliers 1224, 1226, 1236, 1246, and 1248 multiply by the quotient of a running variable divided by $2^r$, where r=4 and $2^r=16$. Multipliers 1242 and 1252 have the same form but have a fixed-value numerator. FIG. 13 illustrates in block diagram form a digital arrangement for dividing an input signal X by a number of the form $2^r$ and multiplying the result by a running variable designated p. In FIG. 13, the running variable multiplier p is applied to an input terminal 1310 and multiplicand x is applied to an input terminal 1320. Multiplicand X is applied (in series or in parallel) to a register 1322 which as illustrated is loaded with an 8-bit digital word 10000001, representing the value 129. The MSB of register 1322 represents a value 128. Division by two is accomplished by loading the contents of register 1322 into the last 8 stages of a 9-bit second register 1324. The MSB of register 1324 also represents the value 128, and is preloaded with the value zero. Consequently, the transfer of 10000001, from register 1322 to register 1324 represents a division-by-two. The value stored in 9-bit register 1324 is transferred to the last 9 stages of 10-bit register 1326, the MSB of which is preloaded with the value of 128. Consequently, the transfer of data from register 1324 to 1325 represents a further division-by-two. The data is further divided by successive transfer to 11-bit register 1328 and 12-bit register 1330. At the end of the transfers, registers 1324, 1326, 1328 and 1330 are loaded with X/2, X/4, X/8, and X/16 respectively. Noting that these components represent 8/16X, 4/16X, 2/16X and 1/16X respectively, it is apparent that any fractional value of X from 1/16 to 15/16 can be obtained as the sum of various combinations of the divided values stored on the registers. In the example illustrated, p has a value of 7 (digital 0111) and therefore the contents of registers 1325, 1328 and 1330 must be summed to produce a sum of 7/16X. The value of p is read into a register 1332. The contents of each stage of register 1332 is used to control the gating of registers 1324-1330 as represented by gates 1334-1340. A value of one in a stage of register 1332 allows the corresponding one of registers 1324-1330 to be gated to further summing circuits. Registers 1324 and 1326 are coupled to inputs of a summing circuit 1342, and the registers 1328 and 1330 are coupled to the inputs of a summing circuit 1344. The outputs of summing circuits 1342 and 1344 are coupled to the input of a further summing circuit 1346 where the final output signal (p/16X) is formed. The blocks illustrated adjacent to summers 1342, 1344 and 1346 illustrate the digital values at those points.

Figure 14:
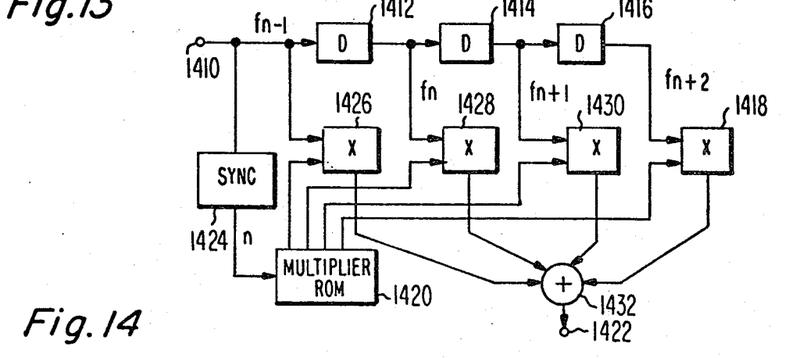
FIG. 14 is a block diagram of a generalized interpolator according to an aspect of the invention.

While the embodiments so far described use the advantages of multiplication by shift-and-add, interpolators of the more general form of FIG. 14 are possible. The sample rates of the input and output signals are selected so that an integer number of transcoding blocks occur during each active line, with simultaneous input and output sample times at the beginning and end of each transcoding block. Such interpolators are advantageous by comparison with the prior art even though standard multipliers are used, because few such multipliers are necessary to achieve a given accuracy. For example, the interpolator of FIG. 14 having 3 multipliers corresponds to a prior-art arrangement having as many as 15 multipliers.

In FIG. 14, an input signal is applied by way of input terminal 1410 to the inputs of a delay element 1412, and a sync or timing circuit 1424. Delay element 1412 delays the signal by a known amount to produce a delayed signal $f_n$ which defines the input signal as $f_{n-1}$. Delayed signal $f_n$ is applied to further delay elements 1414 and 1416 to produce further delayed signals $f_{n+1}$ and $f_{n+2}$.

Signals $f_{n-1}$, $f_n$, $f_{n+1}$, and $f_{n+2}$ are applied to multipliers which may be standard 8×8 multipliers for multiplying the signals by a known function (obtained from table look-up ROM 1420) of the running variable n which is generated by a sync or timing circuit 1424. The multiplied signals are summed in an adder 1432 to produce the desired interpolated output signal at output terminal 1422.

Rather than using a ROM table look-up such as ROM 1228 of FIG. 12 to generate the value of n' from the value of n in accordance with the known pattern of the location in time of new samples $g_n$ between the times of adjacent incoming samples $f_n$ for a given general transcoding, it is possible to use a logic circuit to calculate n' from n according to the equation.

$$n' = (M - 2^r) \times n \pmod{2^r}$$

Figure 16:
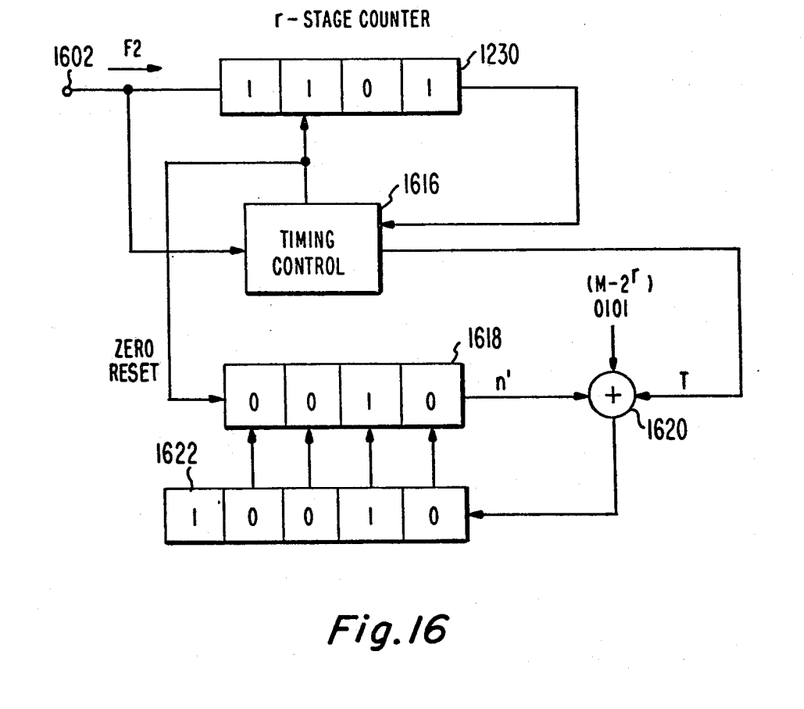
FIG. 16 is a block diagram of an alternative embodiment of an n to n' translator.

FIG. 16 illustrates such a logic circuit.

In FIG. 16, input clock signals at the output or new clock frequency F2 are applied to an r-stage n-counter 1230 corresponding to that of FIG. 12. The F2 clock signals are also applied to a timing control circuit illustrated as a block 1616 which generates reset pulses for counter 1230 and for a n' counter 1618 at the completion of a count of $2^r$ F2 clock pulses by counter 1230. This resets counters 1230 and 1618 at the beginning of each recurrent block of samples. Counter 1230 counts F2 clock pulses to determine the current values of n, the output sample number within each interpolation block. The count currently stored in register 1230 as illustrated is 13 (1101). At each successive F2 clock pulse, timing control 1616 drives a clocked adder 1620 which adds to the value of n' currently stored in n' register 1618 (in the example shown the last or previous value of n' was 13 or 1101) a fixed number ($M=2^r$) which as illustrated is 5 (0101). The sum of the two is stored in a register 1622 having r+1 stages of which the left-hand stage is the most significant. The sum of 5 and the previous value 13 of n' is 18 or 10010, shown as being currently stored in register 1622. The r least significant stages of register 1622 are coupled to corresponding stages of register 1618 for updating the value of n' to the current value. However, because only the LSB of register 1622 are coupled, only these are stored in register 1618 as the new n'. This arrangement causes the value of n' to progress in units of five ($M-2^r$) for each count of n until the sum exceeds the value ($2^r-1$), at which time the MSB in the (r+1) stage of register 1622 is toggled to a logic 1 state. The transfer of the r LSB allows progression by steps of five in modulo $2^r$ fashion.

While the embodiments so far described apply to interpolation between signal samples along the horizontal scanning lines in a digital television system it should be apparent to those skilled in the art that the same interpolation methods can be applied vertically to adjacent signal samples in successive lines for interpolation between signals of different line scanning rates, or in time between cosited samples in successive frames for interpolation between signals at different frame rates.

What is claimed is:

1. A method for transcoding a first signal sampled at a frequency $F_1$ into a second sampled signal, comprising the steps of:

selecting a second clock frequency $F_2$ for said second sampled signal such that the ratio $F_2/F_1$ of first and second clock frequencies is substantially equal to the quotient of a sum and a predetermined power r of two, where said sum is the sum of ± one and said predetermined power r of two; whereby said first and second sample points recur in blocks in which the end samples occur substantially simultaneously and in which the number of samples in one set of samples exceeds that of the other set of samples whereby the times of occurrence of said second signal samples progressively shift between adjacent first sample points over the duration of one block;

determining the value of a first sample of said first signal; determining the value of a second adjacent sample of said first signal;

forming a difference signal between said values of said first and second samples;

weighting said difference signal in accordance with the relative positions in time of said samples within said progression; and summing said weighted difference signal with said value of said first sample of said first signal to form an interpolated sample.

2. A transcoder for transcoding a first television signal sampled at a first frequency (F1) into a second sampled signal by approximation of the values of those samples of said first signal which must be interpolated to form said second signal, comprising:

a clock signal generator coupled to the source of said first signal for generating a second signal sampling clock signal at a second frequency selected such that the ratio of said first and second frequencies is substantially equal to the quotient of integers, whereby said sample points recur in blocks in which the first samples of said first and second signals within a block occur substantially simultaneously and the last sample points of said first and second signals within each block occur substantially simultaneously, and wherein the number of samples of one of said first and second signals within each of said blocks exceeds the number of samples of the other of said first and second signals whereby the times of occurrence of said second signal samples move between the times of occurrence of the samples of adjacent first sample points over the duration of one of said blocks;

delay means coupled to receive said first signal for delaying said first signals to form at least second and third delayed signals delayed from said first, differencing means coupled to said delay means for forming difference signals representing the difference in amplitude between successive delayed signals;

multiplying means coupled to said differencing means for receiving said difference signals and for multiplying said difference signals by a running variable to form weighted difference signals;

running variable generating means coupled to said multiplying means and to said clock signal generating means for generating said running variable indicative of the time position of each new sample between successive samples of said first signal; and summing means coupled to said multiplying means for summing together said weighted difference signals.

3. A transcoder according to claim 2 wherein said running variable generating means comprises:

a counter coupled to receive said clock signal at said second frequency and for counting for the duration of one of said blocks to generate a progressively increasing count signal over the duration of each of said blocks.

4. A transcoder according to claim 3 further comprising a read-only memory coupled to said counter and addressed by said progressively increasing count signal to produce, as said running variable, output signal of a predetermined sequence of numbers representative of the position in time of each of the samples of said second signal relative to the time of adjacent samples of said first signal.

5. A transcoder according to claim 3 wherein said running variable generating means further comprises:

a first register for storing the current value of said running variable representative of the position in time of each of the samples of said second signal relative to the time of adjacent samples of said first signal, said first register having a number of stages related to the number of samples of said second signal in each of said blocks;

timing control means coupled to said counter and to said first register for resetting said counter and said first register to predetermined values at the beginning of each block of samples;

a source of a predetermined number signal related to the numerator of said ratio of said first and second frequencies;

summing means coupled to said source of a predetermined number signal, to said first register and to said timing control means for adding to the current value of said running variable, the value of said predetermined number signal for producing a summed signal having the new value of said running variable; a second register having a number of stages exceeding the number of stages in said first register, said second register being coupled to said timing control means and to said summer for storing said summed signal; and coupling means for coupling at least one of the stages representing a less significant bit of said summed signal with a corresponding stage of said first register for causing said running variable to increase modulo.

6. A method for transcoding a first signal sampled at a frequency, F1 into a second sampled signal by square-law approximation of the values of those samples of said first signal which must be interpolated to form said second sampled signal, comprising the steps of:

selecting a second clock frequency F2 for said second sampled signal such that the ratio (F2/F1) of said first and second clock frequencies is substantially equal to the quotient of an integer and a predetermined power of two, whereby said sample points recur in blocks in which the first and last samples of said first and second signals occur substantially simultaneously and in which the number of samples of one of said first and second signal within said block exceeds the number of samples of the other of said first and second signals whereby the times of occurrence of said second signal samples progressively shift between the times of occurrence of the samples of adjacent first sample points over the duration of one of said blocks;

determining the values of first, second and third samples of said first signal;

forming first and second difference signals between the values of said first and second samples and between the values of said second and third samples, respectively;

weighting said first and second difference signals in accordance with the relative position in time of said samples within said progression;

summing said weighted second difference signal with the value of said second sample of said first signal to form a linearly interpolated intermediate sample between said second and third sample times;

summing said weighted first difference signal with the value of said second sample of said first signal to form a sample linearly extrapolated from said first and second sample points of said first signal;

weighting the value of said linearly interpolated intermediate sample in direct proportion to the relative difference in time of said samples within said progression to form a first sample portion;

weighting the value of said linearly extrapolated intermediate sample by a factor of one minus the weighting of said interpolated intermediate sample to form a second sample portion; and summing said first and second portions to produce the square-law approximated interpolated sample.

7. A transcoder for transcoding a first television signal sampled at a first frequency (F1) into a second sample signal by approximation of the values of those samples of said first signal which must be interpolated to form said second signal, comprising:

a clock signal generator coupled to the source of said first signal for generating a sampling clock signal for said second signal at a second frequency (F2) selected such that the ratio of said first and second frequencies is substantially equal to the quotient of an integer and a predetermined power of two, whereby sample points recur in blocks in which the first samples of said first and second signals within each of said blocks occur substantially simultaneously and the last sample points of said first and second signals within each of said blocks occur substantially simultaneously, and wherein the number of samples of one of said first and second signals within each of said blocks exceeds the number of samples of the other of said first and second signals whereby the times of occurrence of said second signal samples move between the times of occurrence of the samples of adjacent first sample points over the duration of one of said blocks;

delay means coupled to receive said first signal for delaying said first signals to form at least second and third delayed signals delayed from said first;

a running variable signal generator coupled to said clock signal generator for generating running variables related to the time position of each new sample between successive samples of said first signal;

multiplying means coupled to said delay means and to said running variable signal generator for receiving said delayed signals and for multiplying said delayed signals by said running variables to form weighted delayed signals; and summing means coupled to said multiplying means for summing together said weighted delayed signals.

* * * * *